_US005513295A_

United States Patent [19]

Go

[11] Patent Number: 5,513,295
[45] Date of Patent: Apr. 30, 1996

[54] FIBER OPTIC HOLDER

[75] Inventor: Vinson L. Go, Uncasville, Conn.

[73] Assignee: The United States of America as represented by the Secretary of the Navy, Washington, D.C.

[21] Appl. No.: 511,494

[22] Filed: Jul. 11, 1995

[51] Int. Cl.$^6$ .................................................. G02B 6/00
[52] U.S. Cl. .......................... 385/137; 385/72; 385/136
[58] Field of Search .................................... 385/133–139, 385/72

[56] References Cited

U.S. PATENT DOCUMENTS 5,239,604   8/1993   Ziebol et al. ........................... 385/72

FOREIGN PATENT DOCUMENTS 1576336   10/1980   United Kingdom ................... 385/721

Primary Examiner—John D. Lee
Assistant Examiner—Phan T. H. Palmer
Attorney, Agent, or Firm—Michael J. McGowan; Prithvi C. Lall; Michael F. Olgo

[57] ABSTRACT

An optical fiber holding apparatus is provided for nondestructively supporting one or more optical fibers. For each optical fiber, a rod has a slot formed along its length to receive therein one optical fiber. A retainer is mated with the rod such that the retainer is in contact with the optical fiber. A support block has a borehole defined by a first portion extending from a first side of the block to an annular shoulder within the block. The first portion is sized to receive the rod with its optical fiber and retainer so that the retainer holds the optical fiber within the rod's slot. The borehole further has a second portion extending from the annular shoulder through to a second side of the block opposite the first side. The second portion has a cross-section large enough to allow the optical fiber extending the end of the rod to pass through the second side of the block.

18 Claims, 4 Drawing Sheets

FIBER OPTIC HOLDER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to fixtures for holding fiber optics, and more particularly to a fiber optic holder for mechanically holding and aligning many optical fibers that are to be processed in the high-vacuum environment required to form thin films onto the optical fibers' cleaved ends.

(2) Description of the Prior Art

To produce fiber optic mirrors which can be used as acoustic sensors, a totally or partially reflecting mirror must first be formed at the end of an optical fiber using thin-film deposition techniques. First, the fiber end is cleaved, polished and cleaned. A thin film of metal or metal oxide must then be deposited onto the end of the optical fiber. Typically, a sputtering deposition system is used to perform radio frequency (RF) sputtering or direct current (DC) sputtering in a high-vacuum chamber. While DC sputtering is the preferred technique for faster sputtering deposition of thin-film metals, RF sputtering is the preferred, albeit slower, sputtering technique for achieving a more uniform and smoother deposition of thin-film metals. RF sputtering is required for metal oxide thin-film deposition due to the nonconductivity of metal oxides. RF sputtering also allows the recombination of oxygen to any disassociated metal atoms from the metal oxide molecules during the sputtering process.

In general, these forms of thin-film deposition require an initial high vacuum (e.g., on the order of $10^{-1}$ torr) to ensure the purity of the optical-quality thin-film. Contaminants such as oil-type vapors, water vapor, unwanted gas molecules from air, etc., are greatly reduced by means of a very high vacuum. After the initial high vacuum has been achieved, a back pressure of about $5 \times 10^{-3}$ torr of an inert gas, e.g., argon, is introduced into the vacuum chamber and maintained therein. However, regardless of the thin-film process employed, it is necessary to mechanically align and hold the optical fibers such that the thin-film processing can be achieved with repeatable accuracy.

One prior art approach to the problem of mechanical alignment of a plurality of fibers is to mold or pot the optical fibers in a fixture so that a fixed mechanical alignment is achieved. However, potting compounds frequently require hours or even days to cure. Further, the potting compound must be mechanically or chemically removed from the optical fibers after thin-film processing is completed. Another limitation of this approach is that most potting compounds are incompatible with a high-vacuum environment due to the outgassing of the potting compound vapors which usually contain volatile organic compounds. Thus, contamination of the tin-film deposition process is possible since the appropriate high vacuum cannot be used.

Another prior art approach to the problem of mechanically aligning a plurality of optical fibers is to clamp the fibers using a spring-loaded or screw-type compression clamping system. While providing ease of removal once the thin-film processing is complete, the use of mechanical clamping systems almost always introduces the risk of accidental abrasion or overstress of the optical fibers. The inflicted minor damage is frequently not discovered until the fiber is installed in its ultimate application where the fiber will eventually fail and break thereby necessitating time consuming and costly repair.

SUMMARY OF THE INVENTION

Accordingly, it is an object of the present invention to provide an optical fiber holder.

Another object of the present invention is to provide an optical fiber holder for use in a high-vacuum environment.

Still another object of the present invention is to provide an optical fiber holder capable of mechanically holding and aligning a plurality of optical fibers without damaging the optical fibers.

Yet another object of the present invention is to provide an optical fiber holder that is easily assembled and disassembled.

Other objects and advantages of the present invention will become more obvious hereinafter in the specification and drawings.

In accordance with the present invention, an optical fiber holding apparatus non-destructively supports one or more optical fibers. In one embodiment, each optical fiber is associated with a rod having a slot of height H formed along its length to receive therein the optical fiber of diameter D. The optical fiber extends from a first end of the rod to a second end of the rod. A retainer of height (H-D) is fitted in the slot along the entire length of the rod such that the retainer is in contact with the optical fiber. A support block has a borehole defined by a first portion extending from a first side of the block to an annular shoulder within the block. The first portion is sized to receive the rod with its optical fiber and retainer. As a result, the retainer and optical fiber are retained within the rod's slot. The borehole further has a second portion extending from the annular shoulder through to a second side of the block opposite the first side. The second portion has a cross-section large enough to allow the optical fiber extending the end of the rod to pass through the second side of said block. Typically, the rod, retainer and support block are made of metal to withstand a variety of processing environments. The rod and retainer can assume a variety of constructions without departing from the essential principles of the present invention.

BRIEF DESCRIPTION OF THE DRAWINGS

Other objects, features and advantages of the present invention will become apparent upon reference to the following description of the preferred embodiments and to the drawings, wherein.

DESCRIPTION OF THE PREFERRED EMBODIMENT(S)

Figure 1:
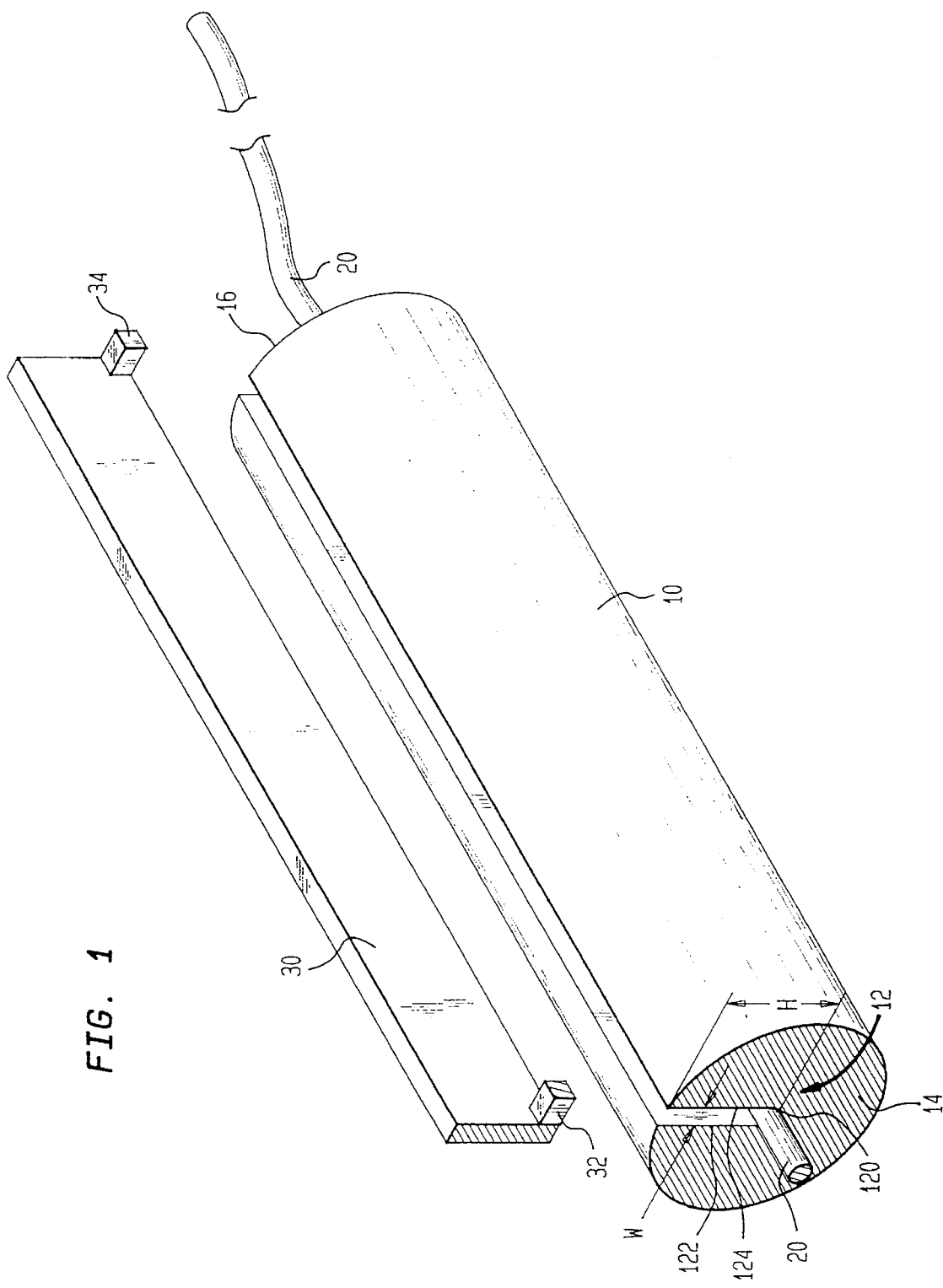
FIG. 1 is a perspective view of the slotted rod used to support an optical fiber and the retainer used to hold the optical fiber in place in the slotted rod prior to the retainer's installation according to one embodiment of the present invention.

Referring now to the drawings, and more particularly to FIG. 1, a perspective view is shown of one embodiment of slotted rod 10 having optical fiber 20 resting therein, and further depicting retainer 30 prior to its mating with or installation in slotted rod 10. Slotted rod 10 is typically a solid rod that is long enough to be easily accessible by hand during its use, e.g., approximately 2–3 inches in length. Slot 12 of height H is formed in rod 10 along the entire length of rod 10 such that slot 12 is open at ends 14 and 16 of rod 10. The width W of slot 12 is selected so that optical fiber 20 of diameter D is in tangential contact with base 120, side 122 and side 124 of slot 12 as best seen in the end view of FIG. 2. Since optical fiber 20 is only in tangential contact with base 120 and sides 122 and 124, the fit does not inhibit the installation and removal of optical fiber 20 from slot 12.

Retainer 30 is selected to have a height $H_{30}$ that is equal to (H - D) and further has a width $W_{30}$ that is sized to comfortably fit within slot 12. In other words, when retainer 30 is placed in slot 12 with optical fiber 20 already in slot 12, retainer 30 contacts optical fiber 20 all along slot 12 and fills the remaining portion of slot 12 as is best shown in the end view of FIG. 2. Optical fiber 20 is held snugly in slot 12 by the friction of retainer 30 resting within slot 12 and on top of optical fiber 20 so that axial movement of optical fiber 20 is inhibited during normal handling. To prevent axial movement of retainer 30 within slot 12, retainer 30 has transversely extending tabs 32 and 34 that cooperate with ends 14 and 16, respectively.

Figure 2:
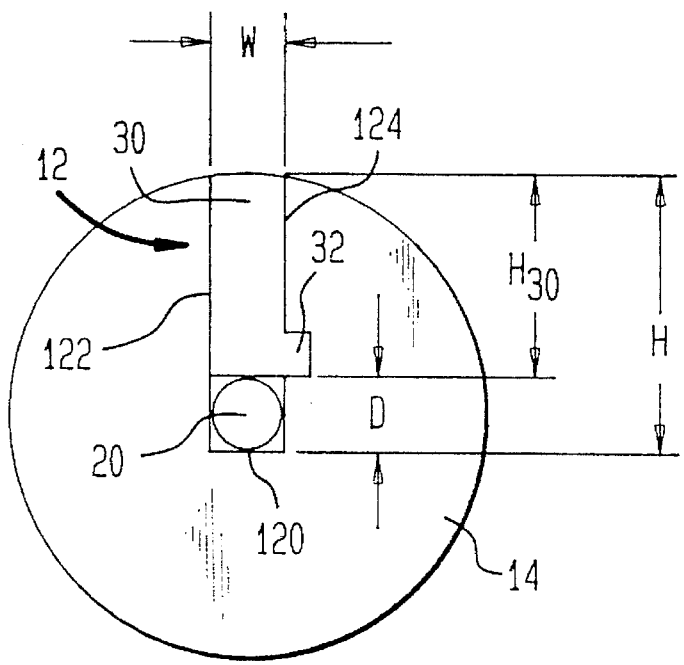
FIG. 2 is an end view of a slotted rod with an optical fiber and retainer according to one embodiment of the present invention.
Figure 3:
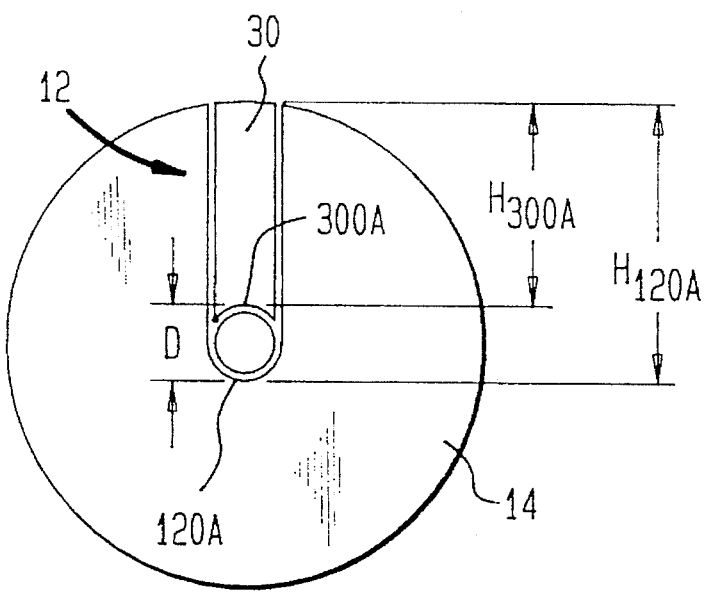
FIG. 3 is an end view of a slotted rod with an optical fiber and retainer according to a second embodiment of the present invention.

As shown in FIG. 2, slot 12 and retainer 30 can be machined to have rectangular cross-sections so that optical fiber 20 is only in tangential contact with slot 12 and retainer 30. Alternatively, as shown in FIG. 3, slot 12 can be machined with concave base 120A to cradle optical fiber 20 on one side thereof while retainer 30 can have concavely shaped base 300A to cradle optical fiber 20 on its other side. The combination shown in FIG. 3, while being more costly to construct, provides for more even distribution of holding pressure along optical fiber 20 retained within slot 12. The height $H_{120A}$ of slot 12 with concave base 120A is measured to the center of the base while the height $H_{300A}$ of retainer 30 with concavely shaped base 300A is measured along the retainer's outside edge.

Figure 4:
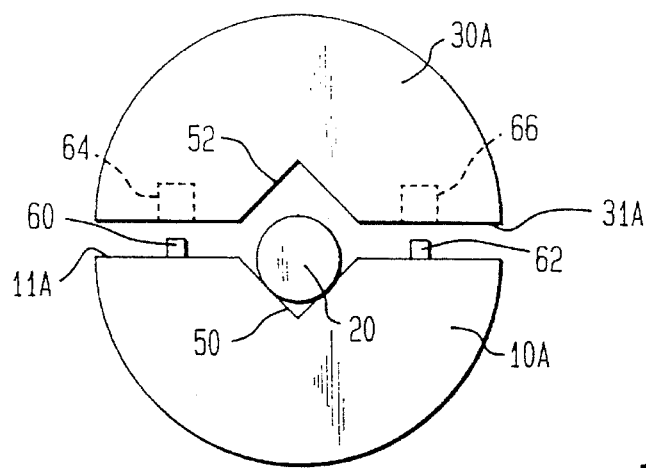
FIG. 4 is an end view of a slotted rod with an optical fiber and retainer according to a third embodiment of the present invention.
Figure 5:
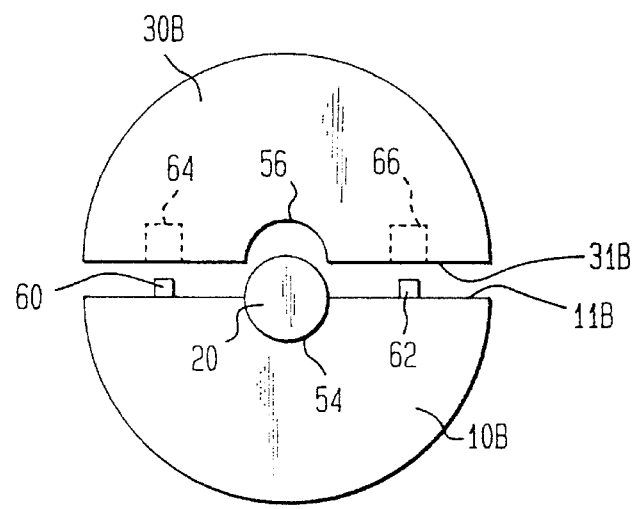
FIG. 5 is an end view of a slotted rod with an optical fiber and retainer according to a fourth embodiment of the present invention.
Figure 6:
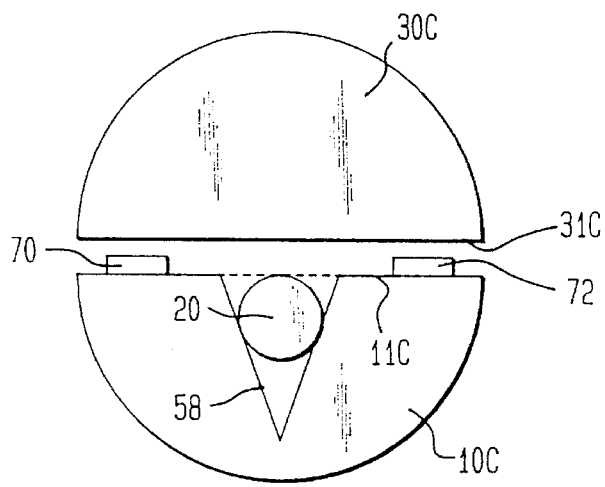
FIG. 6 is an end view of a slotted rod with an optical fiber and retainer according to a fifth embodiment of the present invention.

FIGS. 4, 5 and 6 show end views of additional embodiments of the slotted rod and retainer. For example, in FIG. 4, a solid cylindrical rod is cut in half along its length to form faces 11A and 31A. Identical v-grooves 50 and 52 are respectively formed down the lengthwise center of faces 11A and 31A. The solid rod half with v-groove 50 forms slotted rod 10A while the solid rod half with v-groove 52 forms retainer 30A. Optical fiber 20 resides halfway in each of v-grooves 50 and 52 when slotted rod 10A and retainer 30A are mated or joined together along faces 11A and 31A.

In FIG. 5, a solid cylindrical rod is cut in half along its length to form faces 11B and 31B. Identical half-circle grooves 54 and 56 are respectively formed down the lengthwise center of faces 11B and 31B. The solid rod half with half-circle groove 54 forms slotted rod 10B while the solid rod half with half-circle groove 56 forms retainer 30B. Optical fiber 20 resides halfway in each of half-circle grooves 54 and 56 when slotted rod 10B and retainer 30B are mated or joined together along faces 11B and 31B.

Yet another approach to constructing the slotted rod and retainer combination is shown in FIG. 6. A solid cylindrical rod is cut along its length and only a single v-groove 58 (or rectangular slot) is formed in face 11C of slotted rod 10C for holding all of optical fiber 20 therein. More specifically, v-groove 58 is sized such that flat face 31C of retainer 30C is in tangential contact with optical fiber 20 when retainer 30C is mated with slotted rod 10C.

In each of the embodiments presented in FIGS. 4–6, it is necessary to prevent axial movement between the slotted rod and retainer. One way of achieving this is to provide a plurality of mating pin-to-hole combinations on the mating faces of the slotted rod and retainer. This approach is represented in each the embodiments shown in FIGS. 4 and 5 where pins 60 and 62 respectively cooperate with holes 64 and 66. Alternatively, one of either the slotted rod or retainer could be provided with tabs at either end thereof for axially restraining the mating part. This approach is represented in FIG. 6 where tabs 70 and 72 extend up from end 14C of slotted rod 10C. Similar tabs would be provided at the opposite end of slotted rod 10C.

Figure 7:
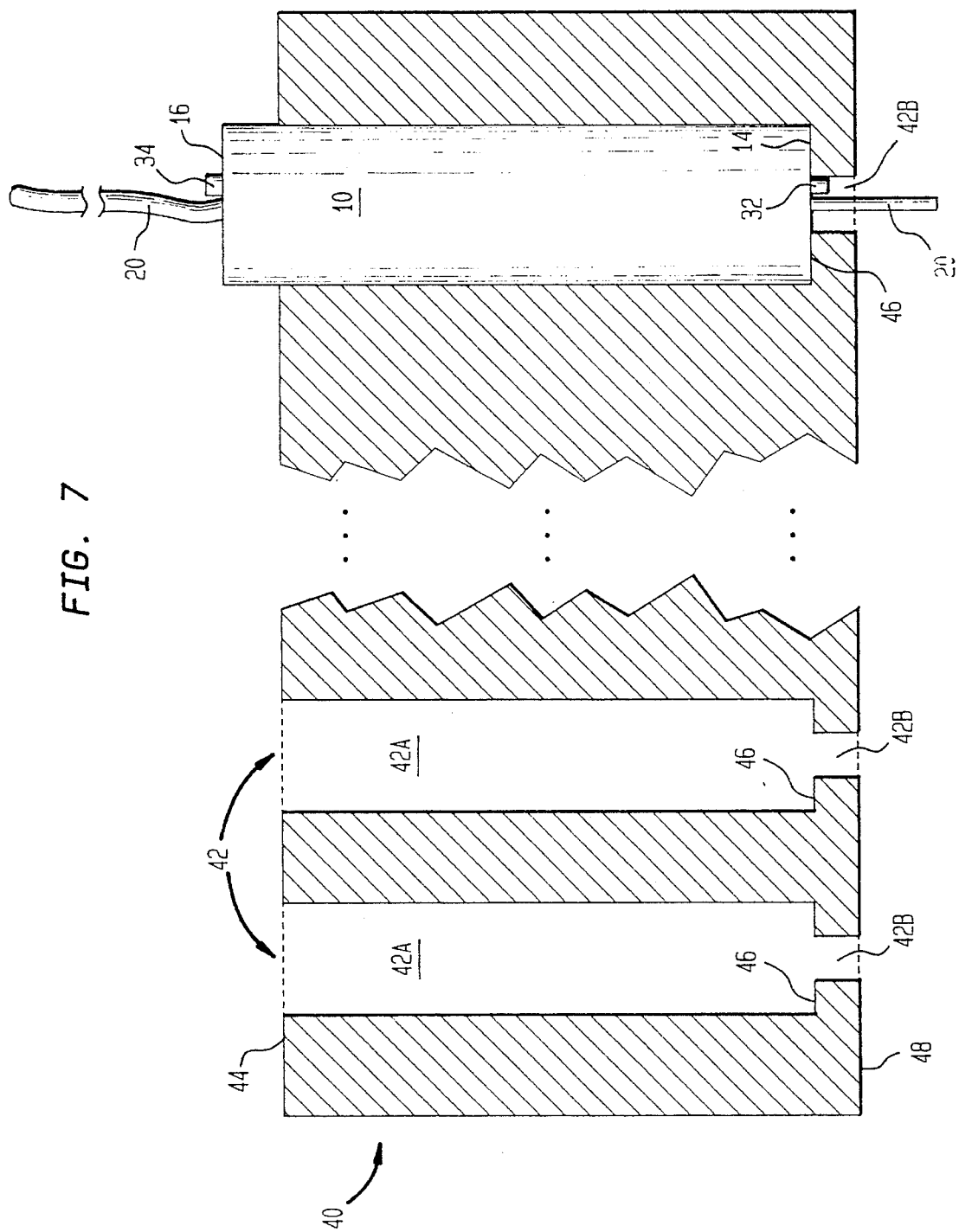
FIG. 7 is, in part, a cross-sectional view of the support block used to hold a plurality of the slotted rod, optical fiber and retainer combinations and, in part, a side view of the support block with one slotted rod with an optical fiber and retainer installed therein.

Regardless of the slotted rod and retainer configuration, the slotted rod with its optical fiber and retainer is inserted into one of a number of boreholes 42 provided in support block 40 as shown in cross-section in FIG. 7. For purpose of illustration, the following description will make reference to the embodiment shown in FIGS. 1 and 2 although it is to be understood that the same principles apply to the additional embodiments.

As shown in FIG. 7, each borehole 42 passes entirely through block 40 and is defined by first portion 42A and second portion 42B. First portion 42A extends from end 44 of block 40 to annular shoulder 46 within block 40. Second portion 42B is of smaller cross-section than first portion 42A and extends from annular shoulder 46 out to end 48 which is opposite end 44. Further, the cross-section of second portion 42B must be large enough to pass optical fiber 20.

First portion 42A is sized to snugly receive slotted rod 10 such that first portion 42A retains retainer 30 in slot 12 as shown in FIGS. 1 and 2. In this way, retainer 30 is maintained in contact with optical fiber 20 all along length of slot 12 thereby distributing holding pressure evenly along optical fiber 20. The snug fit is provided by the sizing of first portion 42A and the resulting friction associated between the side wall of first portion 42A and unit structure formed by the slotted rod-optical fiber-retainer combination. The snug fit prevents the retainer from falling out of engagement with the slotted rod and also provides a gentle and even pressure on the retainer which imparts same to the optical fiber.

End 14 of slotted rod 10 of FIGS. 1 and 2 comes to rest on annular shoulder 46. To assure that slotted rod 10 is stably seated on annular shoulder 46, tab 34 is sized to fit within the cross-sectional area provided by second portion 42B of borehole 42. Note that tab 32 could be similarly sized. Optical fiber 20 extending from end 16 passes through second portion 42B and out end 48 of block 44.

The present invention will frequently need to function in high-vacuum environment, e.g., a high-vacuum is defined herein as being between $10^{-3}$ to $10^{-11}$ torr. (In thin-film processing, an initial vacuum of $10^{-6}$ to $10^{-11}$ torr or greater is generally followed with a back pressure of approximately $5 \times 10^{-3}$ torr.) Thus, the slotted rod, retainer and support block must be compatible with and capable of withstanding the high vacuum. Accordingly, each of these elements is typically made of metal. However, any material that can withstand a high-vacuum environment without contaminating the high-vacuum itself (from micron-size shedding or vapor outgassing) can be used as material for each of these elements. Such materials can be certain types of ceramics, composite materials, glasses, and certain high-vacuum compatible epoxies, resins or plastics. The advantages of using metal include its durability (i.e., not fragile), ease of manufacture, and ease of cleaning.

In a thin-film processing operation, a plurality of optical fibers are cut to length and stripped of their protective coating at the ends that are to undergo thin-film processing. The ends to be processed are usually first flattened using an optical fiber cleaving tool, then polished and cleaned before each optical fiber is placed into a slot of a respective slotted rod. A retainer is placed in each slot and each combination of slotted rod, optical fiber and retainer is placed in a borehole, e.g., borehole 42, of support block 40 so that all cut, polished and cleaned ends of the optical fibers extend slightly from end 48 of block 40. Support block 40 can be supported or clamped in a vacuum chamber (not shown) used during the application of thin films to the ends of the optical fibers. After processing is complete, the optical fibers are easily removed without the need for post-processing or cleaning of the optical fibers.

Although the present invention has been described relative to specific embodiments thereof, it is not so limited. For example, the shape and length of each slotted rod, as well as the associated borehole within the support block, can be varied to suit manufacturing constraints. The material used for each slotted rod, retainer and the support block can be any material that is compatible with and can withstand the processing environment for which the optical fibers are being prepared. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for non-destructively supporting an optical fiber, comprising:
   a rod having a slot formed along the length of said rod for receiving at least partially therein one optical fiber so that said one optical fiber extends from a first end of said rod and a second end of said rod;
   a retainer mated with said rod and contacting said one optical fiber for restraining axial movement of said one optical fiber between said rod and said retainer by means of friction between said one optical fiber and said retainer; and
   a block having a borehole passing therethrough, said borehole having a first portion extending from a first side of said block to an annular shoulder within said block, said first portion sized to receive said rod mated with said retainer, said borehole further having a second portion extending from said annular shoulder through to a second side of said block opposite said first side, said second portion having a cross-section large enough to allow said one optical fiber extending from one of said first end and said second end of said rod to pass through said second side of said block, said cross-section of said second portion further being smaller than a cross-section of said first portion.

2. An apparatus as in claim 1 wherein said rod, said retainer and said block are made from metal.

3. An apparatus as in claim 1 wherein said retainer mated with said rod form a cylindrical unit, and wherein said first portion of said borehole is cylindrical.

4. An apparatus as in claim 1 wherein said slot has a base that is concave.

5. An apparatus as in claim 1 wherein said slot is a v-groove.

6. An apparatus as in claim 5 wherein said v-groove is sized to receive the entirety of said one optical fiber.

7. An apparatus as in claim 1 wherein said retainer is concave where said retainer contacts said one optical fiber.

8. An apparatus as in claim 1 further comprising means cooperating between said rod and said retainer for preventing axial movement between said rod and said retainer when said retainer is mated with said rod.

9. An apparatus as in claim 1 wherein said retainer further comprises tabs extending transversely from either end of said retainer for engaging said first end of said rod and said second end of said rod, respectively, wherein said retainer is prevented from moving axially within said rod.

10. An apparatus comprising:
    an optical fiber;
    a rod having a slot formed along the length of said rod for receiving at least partially therein said optical fiber so that said optical fiber extends from a first end of said rod and a second end of said rod;
    a retainer mated with said rod and contacting said optical fiber for restraining axial movement of said optical fiber between said rod and said retainer by means of friction between said optical fiber and said retainer; and
    a block having a borehole passing therethrough, said borehole having a first portion extending from a first side of said block to an annular shoulder within said block, said first portion sized to receive said rod mated with said retainer, said borehole further having a second portion extending from said annular shoulder through to a second side of said block opposite said first side, said second portion having a cross-section large enough to allow said optical fiber extending from one of said first end and said second end of said rod to pass through said second side of said block, said cross-section of said second portion further being smaller than a cross-section of said first portion.

11. An apparatus as in claim 10 further comprising corresponding pluralities of said optical fiber, said rod, said retainer, and said borehole.

12. An apparatus for non-destructively supporting an optical fiber, comprising:
    a rod having a slot of height H formed along the length of said rod for receiving therein one optical fiber of diameter D so that said one optical fiber extends from a first end of said rod and a second end of said rod;
    a retainer of height (H-D), said retainer fitted in said slot along the entire length of said rod such that said retainer is in contact with said one optical fiber; and a block having a borehole passing therethrough, said borehole having a first portion extending from a first side of said block to an annular shoulder within said block, said first portion sized to receive said rod wherein said retainer is retained within said slot, said borehole further having a second portion extending from said annular shoulder through to a second side of said block opposite said first side, said second portion having a cross-section large enough to allow said one optical fiber extending from one of said first end and said second end of said rod to pass through said second side of said block, said cross-section of said second portion further being smaller than a cross-section of said first portion.

13. An apparatus as in claim 12 wherein said rod, said retainer and said block are made from metal.

14. An apparatus as in claim 12 wherein said rod, said first portion of said borehole and said second portion of said borehole are cylindrical.

15. An apparatus as in claim 12 wherein said slot has a base that is concave.

16. An apparatus as in claim 12 wherein said retainer is concave where said retainer contacts said one optical fiber.

17. An apparatus as in claim 12 wherein said retainer further comprises tabs extending transversely from either end of said retainer for engaging said first end of said rod and said second end of said rod, respectively, wherein said retainer is prevented from moving axially within said rod.

18. An apparatus as in claim 12 wherein said slot has a width W that is approximately equal to said diameter D of said one optical fiber.

* * * * *